United States Patent [19]

Matthews

[11] Patent Number: 5,568,265
[45] Date of Patent: Oct. 22, 1996

[54] PIPE FITTING ALIGNMENT SYSTEMS

[76] Inventor: David S. Matthews, 810 Salem Dr., Ballston Spa, N.Y. 12020

[21] Appl. No.: 417,383

[22] Filed: Apr. 5, 1995

[51] Int. Cl.⁶ .......................... G01B 11/26; G01C 15/00
[52] U.S. Cl. ...................... 356/399; 33/286; 356/138
[58] Field of Search .................... 356/138, 139, 356/250, 153, 399–400, 152.1, 139.05, 5.09, 4.01, 3.16; 33/DIG. 21, 286, 290–291, 293–295

[56] References Cited

U.S. PATENT DOCUMENTS

| | | | |
|---|---|---|---|
| 3,815,250 | 6/1974 | Roodvoets et al. | 33/286 |
| 4,828,377 | 5/1989 | Putland | 356/399 X |
| 5,148,232 | 9/1992 | Duey et al. | 356/152 |
| 5,400,514 | 3/1995 | Imbrie et al. | 33/286 |

*Primary Examiner*—K. Hantis
*Attorney, Agent, or Firm*—Schmeiser, Olsen & Watts

[57] ABSTRACT

Alignment system and method for use by pipefitters. A portable hand tool having the appearances of a flashlight and the capability of projecting a collimated, coherent or otherwise directed, highly focused and narrow light beam is provided a multiply threaded end opposite the end of light emanation, swivel capability about its elongate axis and bubble-type level devices. A targeting subsystem, for use with the light emanating tool, completes the alignment system. A portion of the targeting subsystem uses a vertically adjustable stand having a bracket useful both for alignment of piping and/or pipe supports, as well as for securing target placards. The target placards are indexed referencing elements that are capturable by the stand bracket or otherwise suspendable pipe straps and brackets (supports). The system lends itself to highly diverse forms of application, in a host of piping and plumbing system installations, and is readily manipulable by a single person.

17 Claims, 3 Drawing Sheets

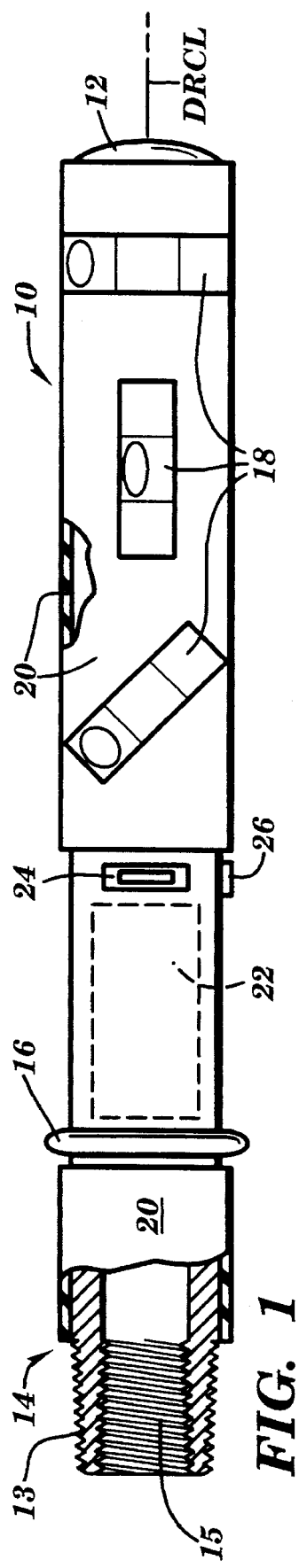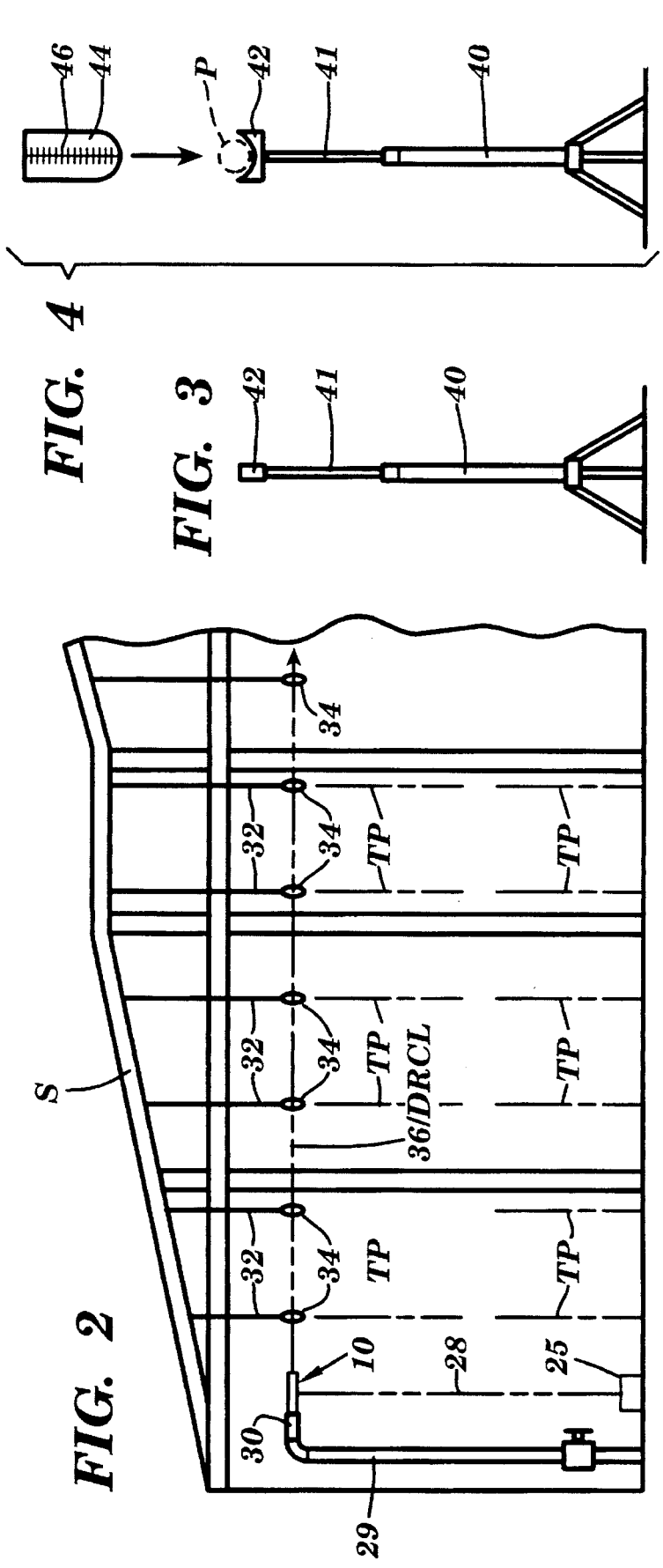

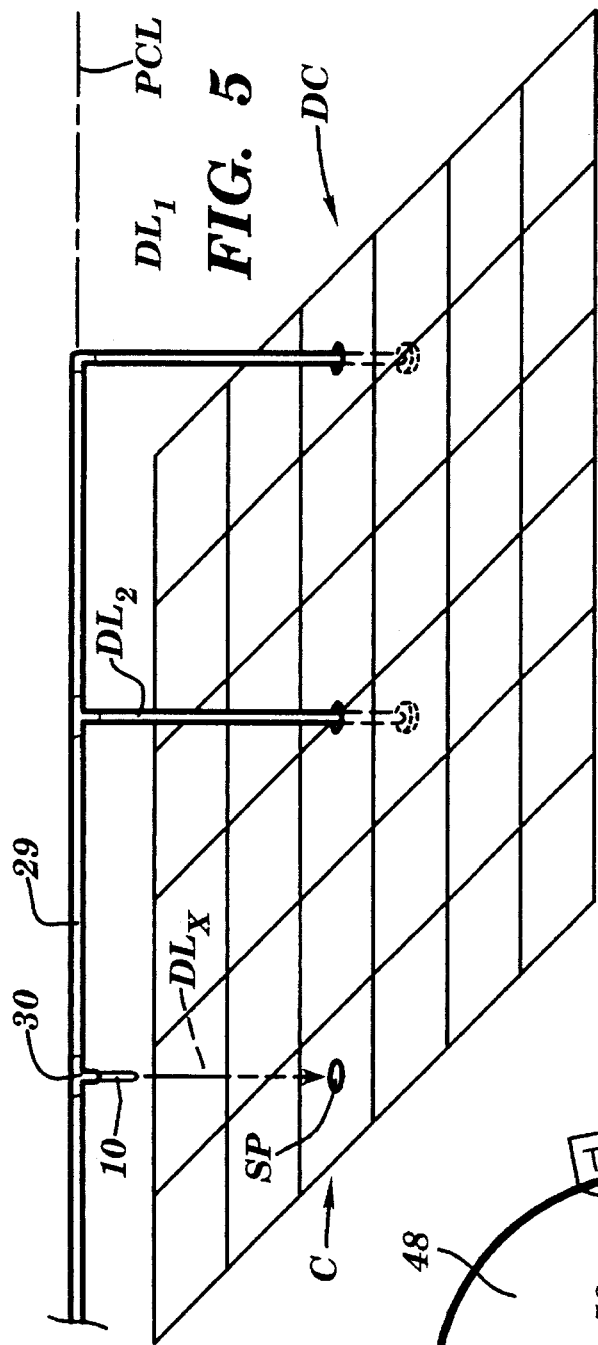
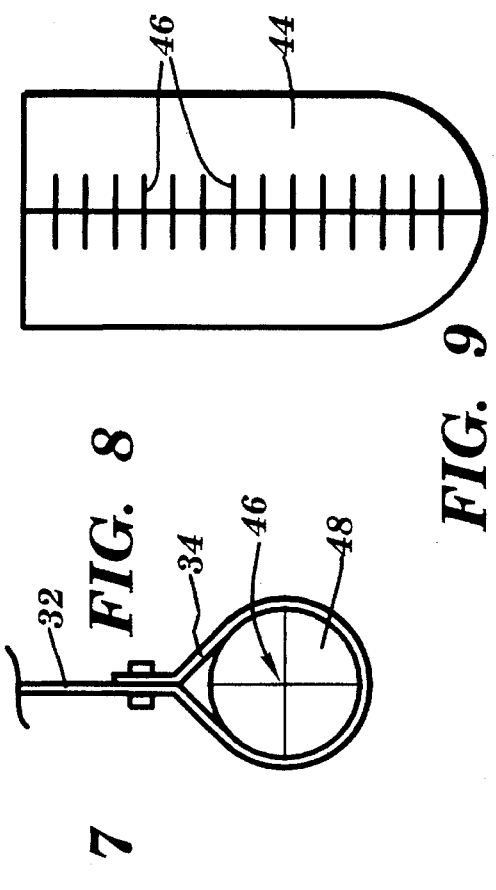
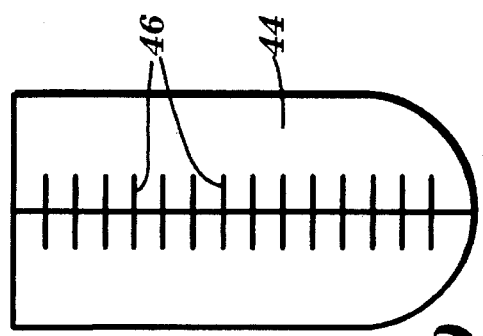
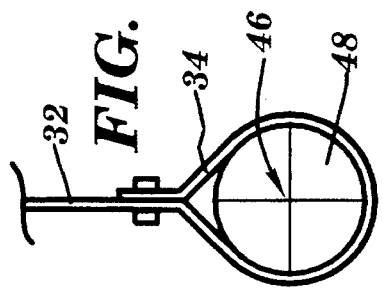
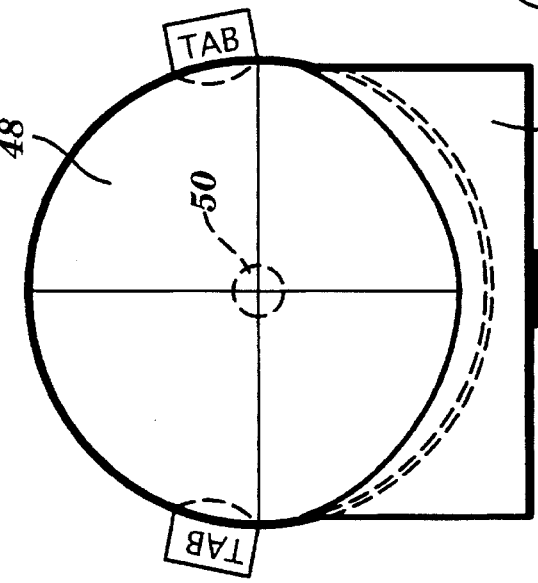

PIPE FITTING ALIGNMENT SYSTEMS

BACKGROUND OF THE INVENTION

1. Field of the Invention

This invention relates generally to a pipe fitting alignment method and, particularly, to use of an alignment system which employs a tool that projects a highly focused or collimated beam of light.

2. Discussion of Relevant Art

Several constructions exist in the art for the alignment of conduit, such as sprinkler or sewer pipes, that employ coherent light sources and various target apparata. Most relevant to the instant invention are U.S. Pat. Nos. 3,631,601 ('601), 4,968,147 ('147), and 4,681,439 ('439).

Patent '601 employs a laser beam to set a series of pipe sections in place along a predetermined line and grade by mounting the laser projector inside of a first pipe section preset on the desired line and grade by conventional surveying techniques. Using adjusting screws on its mounting housing, the laser projector is set within the first pipe section and precisely centered on a remote target position on the proper grade and line. With a laser beam projecting down the desired pipeline, at the proper grade angle, successive pipe sections are set in place by placing the target within each successive pipe section and moving each pipe section laterally or vertically as required to center the target on the laser beam. Thus, there is disclosed a laser projector, freestanding within a pipe section, an auxiliary power supply for the laser projector and, at least one pipe section embracing a moveable target therein. Notable incidents of this disclosure are: the projector is set inside the pipe bore, in fact, entirely enclosed within the bore; there is no alignment with the central axis of the pipe or conduit itself; and, the procedure is extremely labor intensive.

U.S. Pat. Nos. '147 and '439 are issued to the same inventor and disclose a target insert for use with a laser aligning system and a pipe laying method and apparatus, respectively. Of '147, a base target apparatus is disclosed for aligning a length of pipe along the longitudinal axis of a pipe string wherein the target apparatus includes a base unit, containing a target unit, and having one tapered end which is dimensioned to be received in the bell end of the pipe. The other end of the base unit is provided with an anchor unit which is dimensioned to be fictionally engaged in the spigot end of the length of pipe. The target disclosed is square in geometry and bears thereon a set of crosshairs or indices. It is captured in a hoop, that is secured to a spigot end of a pipe, so that the target is presented in a plane transverse to the pipe centerline. To the extent that the target is embraced by the pipe, or a stylized extension thereof, it is analagous to the '601 apparatus. In a not too dissimilar vein, '439 discloses a method and apparatus which are employed to give the operator of excavating equipment a quick and accurate visual indication of the amount of excavation required to obtain a desired grade level. The apparatus comprises: a laser unit; a representative pipe section; a centerline target unit; and, a grade checker unit. Alignment of a laser beam projected from the laser unit to selected portions of a stationary target element and of an adjustable target element, on the centerline target unit and the grade checker unit respectively, determines the desired grade depth. The significant aspects of '439 are: the laser unit is a free-standing projector, that is, it stands on the grade or ground over which the pipe is to be layed; the centerline target unit is embraced by the representative pipe section; and, the stationary target element is placed downrange of the laser beam, is freestanding and contains adjustable panels within its framework. The method of applying '439 is practically identical to that of '601, the exception being that rather than place sections of the pipe in the downrange centerline of the projected beam, a plurality of targets, adjustable to give the laser beam observer an indication of how high or low a particular targets's base index is off the laser beam centerline, is deployed. Once the positions are denoted and the proper reference depth is read, excavation is commenced to the proper grade and depth so that the selected pipework may be layed coaxially along the laser beam downrange centerline. As in '601, the method and apparatus of '439 is extremely labor intensive.

Although the aforementioned systems are of significant value in their work environment, what is needed for the lone individual tradesman is a pipe fitting alignment system that is less costly to realize and set up, less time consuming to align and is within the capability of a single person to use.

Incorporation by Reference

In order to make the instant disclosure completely comprehensive with respect to the field, U.S. Pat. Nos. 3,631,601, 4,968,147 and, 4,681,439 are hereinafter incorporated by reference.

SUMMARY OF THE INVENTION

The instant invention provides a method for installing piping such as sewage and drainage piping, above- and below-ground sprinkler systems, suspended electrical conduit systems, shipyard and plumbing systems of all types and underground sewage line distribution networks such as found in septic systems. The predominate feature of the system, the alignment tool, is and end-threaded, axially adjustable, level-containing elongate tool that projects a collimated beam of light, generally a coherent form such as a laser beam, toward a downrange target. By means of the end threads, the tool is attached to a preset, but not fixed, piece of pipe or conduit that is to be extended as a piping network. Adapters are used as required to mate the threaded end of the tool to the starter piece of conduit or pipe. Then, by suitable fixing means, tightening or cementing, the starter pipe portion is securely fixed and the tool remains in its predetermined position, in preparation for casting the downrange collimated or coherent beam of light. Targets are established downrange of the laser beam by one of two preferred methods: (1) a removable, indexed placard, effective for illumination by the light beam is inserted into a bracket holder having a cup or "U" shape and which is attached to the topmost extension of a vertically adjustable stand; and (2) a circular indexed placard that is adapted, by use of adhesive tape tabs, for capture or embracement by pipe strap hoops/brackets and the inner surfaces of pipes/conduits. The circular targets have the added feature of construction in several diameters such that they may be either inserted in the hoops/pipes, with the adhesive tabs securing them within, or merely placed at the rims of a hoop/pipe with the tabs providing the same securement means. Any of these target placards is readily perforated on the centerline of the indices or crosshairs. This allows, in the case of multiple target usage, an established laser beam to project through the successive target placards as they are set up on a downrange centerline as traced for later pipe, conduit or bracket installation.

Regarding the alignment tool itself, there is provided an essentially tubular housing having an elongate axis and containing therein a collimated light source. One end of the tool bears outer male threads and inner female threads, both sets of threads having standard diameters that are encountered in the trade of usage. The housing is also adapted with a swivel for rotating the tool axially after the threaded end is secured in the aforementioned first pipe section of the system to be constructed. Bubble levels are provided in the housing so that adjustments in the initial alignment can be readily made by a single person having, at most, one free hand. An internal battery source is provided for energizing the laser circuitry, but an external source is also available as shown in prior art applications. Other incidents, besides the targeting apparatus are the various adapter couplings found commonly throughout the trade. These are used in cases where the outer or inner diameter of the tool threaded end must be adapted to a particular size pipe.

BRIEF DESCRIPTION OF THE DRAWINGS

Of the drawings:

FIG. 1 is an illustration of the alignment tool;

FIG. 2 is a schematic showing application of the tool during installation of a sprinkler system;

FIG. 3 is a side illustration of the target/pipe stand;

FIG. 4 is a front illustration of the target/pipe stand showing a pipe cross-section (phantom) and a target placard;

FIG. 5 is another application of the tool during installation of a sprinkler system with a drop ceiling;

FIGS. 6 through 9 illustrate a circular target placard and stand bracket in frontal elevation, the bracket in side elevation; a pipe strap-captured circular target and an indexed curvilinear placard, respectively; and, FIG. 10 illustrates a tool/pipe thread adaptation.

DETAILED DESCRIPTION OF THE PREFERRED EMBODIMENT

Figure 10:
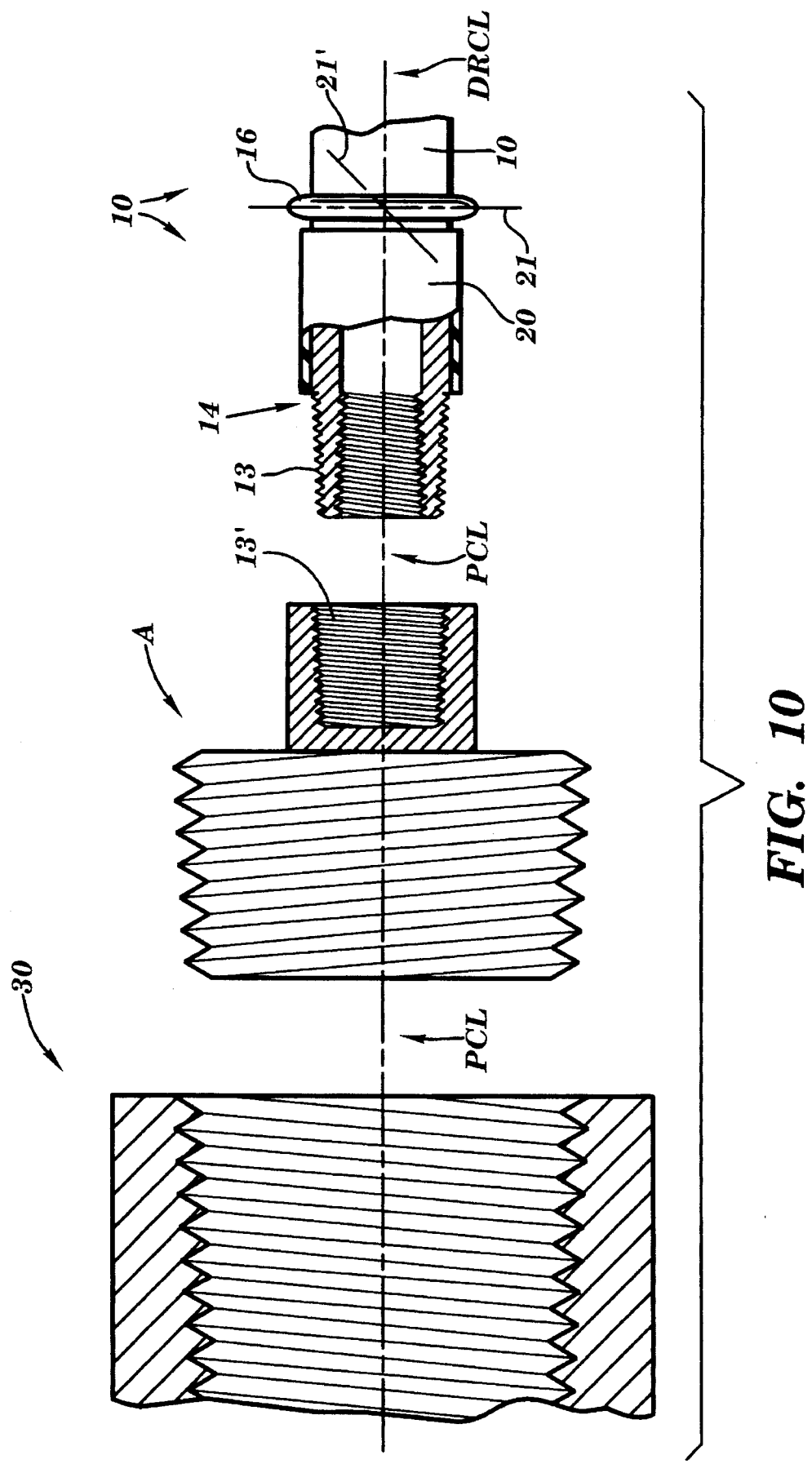

The heart of the alignment system is a hand-held alignment tool 10. The elongate tool resembles, in a few aspects, a common flashlight; but apart from this remote similarity, it differs greatly in operation and application. Within the elongate structure 10, there is contained circuitry and optics 12 for generating and emanating a collimated or coherent beam of light. At the end opposite light emanation there is provided a set of threads 14 in which an external male thread 13, consisting of a standard such as one inch, and an internal threading or female thread 15 of a lower standard thread, say five or seven-eighths inch. Interposed the two ends, but proximate the threaded end, is a swivel 16 that allows both ends to be rotated up to 360° relative to each other. The tool body is made of hardened steel with an outside rubber padding 20. This padding 20 holds firmly in place a plurality of bubble levels 18. The padding 20 prevents damage to the tool as well as provides a securement for the bubble levels 18. Proximate the operating circuitry (not shown) of the laser is a battery compartment 22, an operating (on/off) switch 24 and a port 26 for connection of external power. The laser is capable of operation on internal battery power (of 3–6 volts) or external power, as is known in the art, for up to several hours. Beam projection is a minimum of 100 feet using a laser diode having a 670 nanometer rating. As shown in FIG. 1, light emanation is projected along an axis termed the downrange centerline DRCL.

Application of the tool in the alignment method is rather straight forward. Consider the setup of FIG. 2, an overhead structure S is to be used for suspending therefrom a sprinkler system consisting in a network of pipes. Beginning at the left hand side of the figure with a inlet piping 29, at the desired height, an elbow and a pipe end 30 are snugly but not permanently fixed as shown. The tool 10 is threaded into the end pipe 30 and, here, connected by cable 28 to external power supply 25. Using the bubble level 18 of the tool 10, a proper grade or pitch 36 is determined and the pipes, including the (end) pipe 30 are secured by cementing or other means known in the trade. Once the grade 36 is established and the tool is operated, the grade 36 becomes the downrange centerline DRCL. A series of suspensions 32 are then made from the supporting structure S. As will be seen more clearly in the discussion of FIG. 8, pipe straps 32 are fitted with brackets 34 of a circular configuration. The brackets are used to capture circular placards that serve as targets of the invention. As each target, beginning proximate the tool 10, is properly aligned and reflective of the downrange emanation of the tool 10, the extension and brackets are secured and the next succeeding suspensions and brackets 32/34 are constructed. In cases where the piping suspension is not too high, a targeting stand is used as disclosed in FIGS. 3 and 4.

Referring specifically to FIG. 3, a telescoping stand 40 with extension 41 and U bracket 42 is disclosed in side elevation. FIG. 4 illustrates the FIG. 3 device in frontal elevation, with additional incidents. The U bracket 42 is shown as receiving a pipe (phantom cross-section) P resting within the cup of the bracket 42. The bracket 42 is slotted (see FIG. 7) to receive therein either circular placard 48 or a curvilinear placard 44. The target placards are generally inserted in the bracket 42 and the stand is presented in essentially the areas shown in FIG. 2 (TP) for target position. Once the stand 40 with target 44, 48 is properly aligned with the downrange centerline DRCL, the placards may be removed. Then, either a pipe section P is installed, resting on the bracket 42, or a suspension and pipe strap bracket 32/34 is constructed so that the bracket 34 occupies the position shown by the pipe section P of FIG. 4. This process is continued seriatim until all of the pipe sections are in place and supporting and/or brackets securely attached.

Another common pipe array for a sprinkler system is depicted in FIG. 5. There, a sprinkler pipe network 29, 30 is being installed overhead and constructed to project down through a drop ceiling DC. After the pipe array 29, 30 is constructed, as was the network described in FIG. 2, the alignment tool 10 is fitted, by adaptive threading, into downward projecting elbows or tees (as seen in association with downlines $DL_x$) in order to locate the proper subpoint SP through which to pass the downline. As preparations for locating the subpoint are being made, a first column C of ceiling panels, part of the drop ceiling DC, are removably installed. A round target placard 48 (as seen in FIG. 6) is generally used beneath the tool 10 in order to locate the subpoint SP that is illuminated by the beam in the DRCL. A placard 48, which has its perforable center 50 removed, may be manipulated in the DRCL until the perforable center 50, which has been removed, is illuminated. At this point, the beam is shut off and a marking pencil is used to denote the center of the subpoint which is exposed on the drop ceiling panel through the perforable portion 50 of the placard 48. With all supports for the drop ceiling in place, the marked panel may now be set (in place) and the succeeding subpoints for downlines $DL_{2-x}$ located. Those skilled in the assembly of such apparatus should realize that any mode or any method of installation may be used, the aforesaid merely being given as an example.

FIG. 6 is an illustration of the bracket 42 set upon the stand extension 41. The arch, that is the U shape, of the bracket 42 may differ from the curvature of the target placard 48, here a disc. The target disc 48 may be manufactured in several diameters in order to accomodate capture by pipe strap brackets (Shown in FIG. 8). The bracket 42, however, should be able to accomodate many diameters of pipe, ranging from approximately one inch O.D. to approximately six inches. Thus, the "cup" of the bracket will be shallower than the curvature of all but a six inch diameter disc placard 48 in order to accept several diameters of placard and/or pipe. FIG. 7 displays the FIG. 6 apparatus in side elevation and without the placard 48. The width of the slot 43 is somewhat exaggerated since it will depend generally on the thickness of the placard 48 which is to be inserted therein.

A typical arrangement of the target apparatus that was used in the FIG. 2 description is now set forth in FIG. 8. Therein, the placard 48, bearing crosshairs 46 is shown captive in a pipe strap bracket 34 that is attached to a suspension 32. Referring to FIG. 9, there is illustrated a frontal or target view of a curvilinear placard 44 that bears thereon a series of crosshairs 46 in central array. This placard 44 is the preferred type for use with the bracket 42. Its lower arcuate portion is designed to fit snugly in bracket 42 slot 43. When properly used, the crosshair indices 46 may be used for measuring radial distances off the bracket arch, thus enabling the alignment technician to accurately determine the centerpoint of a pipe or conduit in the network being assembled. For example, if a three inch pipe is to be used, and final installation and adjustment is to be made using the stand 40, the laser beam should be centered at a one and one half inch mark above the bracket arch. This will assure that, as a three inch pipe is guided into connection while resting on the bracket arch, the DRCL would be coincident with the pipe centerline PCL. The foregoing was given as example and is not meant to constrain application of the invention in any way.

Finally, FIG. 10 illustrates the method for attaching the tool 10 to a pipe 30 by means of adapter A. The adapter may be a conduit piece that is used for the purposes of adapting one pipe section to another, but such is not necessary. The adapter A may be of a "homemade" type or may consist in the connection of two or more pieces of existing pipe connectors. The main purpose of this adaptation is to assure that the pipe centerline PCL is coaxially aligned with, and in effect, becomes the DRCL. The reader should note that the tool 10 threaded end 14, having an exterior male thread 13, is mated to the adapter A interior threaded nipple 13' to complete the centerline mergence. The partially sectioned padding 20 is illustrated, as is its proximate feature the swivel 16. Depending upon manufacturer's desire, swivel 16 may be realized as a mechanism for effecting mere rotation through 360° or, in the alternative, a dog-leg jointing by which the centerline of the tool may be articulated to a 45° or 90° change of direction. Such would occur at the swivel joint/plane 21, 21'. Such swiveling or articulation of a tubular object is well known in the art and can be seen in many hand tools such as portable hand drills or hand grinders. Such has been contemplated for this invention, but declined in the preferred embodiment since a rigid tool axis is conducive to the final alignment and setting (or securing) of an end pipe 30 that was discussed in the first application of the invention.

The reader should recognize and understand that the above description was made principally by way of an example and that various modifications and differences of technique will occur to those skilled in the art, such as the alternative swivel joint/plane device discussed in FIG. 10. Those using the invention and the methodology adapted thereby are encouraged to do so consistent with the hereinafter appended claims.

What is claimed is:

1. An alignment tool for pipe layout and installation comprising:

an essentially tubular means having an elongate axis and containing therein a collimated light emanation means and including a power source input means for operating said light emanation means, operating switch means, rotation means for axially twisting an independent portion of said tubular means wherein leveling means is on the independent portion so as to allow the leveling means to be placed in a position to be accurately read, and threading means disposed over and inside an end of the tubular means.

2. The tool of claim 1 wherein said collimated light emanation means is a laser.

3. The tool of claim 2 wherein said input means is an electric power interface for transferring and operating power to circuitry for the laser.

4. The tool of claim 3 wherein said operating switch means is an electric power switch.

5. The tool of claim 4 wherein said rotation means is a circular, rotatable joint means which allows a portion of the tool to effect rotation with respect to said elongate axis.

6. The tool of claim 5 wherein said threading means comprises a male thread on said end and a female thread internal of the same said end.

7. The tool of claim 1 wherein said leveling means is a set of bubble levels disposed on the tool, the set effective for determining alignment of the tool with reference to vertical and horizontal planes of reference.

8. An alignment system for installing conduit using a readily fixable and alignable light beam source comprising:

an end-threaded light beam source effective for axially threaded attachment to an open-ended pipe and, further effective for transmission of a beam of collimated or focused light to a distal target means, said light beam source contained in an essentially tubular means having an elongate axis and including a power source input means, rotation means for axially twisting an independent portion of said tubular means, wherein said leveling means is on the independent portion so as to allow the leveling means to be placed in a position to be accurately read; and at least one said distal target means for reflecting the incidence of said beam thereon, said target means adjustable vertically and in a plane transverse to said beam, said target means including a pipe-securement alignment means.

9. The system of claim 8 wherein said light source is a level-bearing tubular laser having inside and outside threads at an end thereof for fitting to an open end of a pipe and alignment coaxially therewith.

10. The system of claim 9 wherein said target means comprises a vertically adjustable, moveable stand bearing thereon slotted means for holding a planar target.

11. The system of claim 10 wherein said slotted means is a "U" shaped bracket disposed on the topmost part of the stand.

12. The system of claim 9 wherein said target means comprises a placard which contains a centrally disposed, perforable area, said placard comprising shape and strength effective for strap encirclement thereabout and including adhesive tab means.

13. The system of claim 12 wherein said placard is also said pipe-securement alignment means and comprises a disc of stiffness sufficient for embracement by a loop of adjustably suspended pipe strap.

14. A method for installing piping using an end-threaded, axially adjustable, level-containing elongate tool that projects a collimated beam of light, said method comprising:

adaptingly attaching said tool by its threaded end to an open and positioned conduit means, rotating an independent portion of said tool, wherein said independent portion includes leveling means, said rotating allows the leveling means to be placed in a position to be accurately read, said attaching including when required, selecting and installing in the conduit means a pipe thread adapter means, said attaching further including orienting, by leveling, the attached tool and permanently fixing the conduit means;

operating the tool by connecting a power source to operating circuitry of the tool;

presenting a target means which is illuminable by a light beam projecting from the tool, said presenting including holding temporarily in said beam a removable sighting reference means on which a user of the tool may observe a sub-point of said beam;

securing conduit fixing means for prospectively intalling a conduit element coaxially along said beam through said sub-point; and repeating said presenting and securing steps as the user may desire.

15. The method of claim 14 wherein permanently fixing the conduit means comprises tightening and cementing according to conventional practice in the pipefitting trade.

16. The method of claim 15 wherein said presenting step includes erecting a vertically adjustable target holding means that is capable of temporarily capturing a sighting reference means.

17. The method of claim 15 wherein said presenting step includes suspending a vertically adjustable target holding means that is capable of temporarily capturing a sighting reference means.

* * * * *